US012399838B2

United States Patent
Gupta et al.

(10) Patent No.: US 12,399,838 B2
(45) Date of Patent: *Aug. 26, 2025

(54) INTEGRATION OF APPLICATION INDICATED MAXIMUM TIME TO CACHE TO LEAST RECENTLY USED TRACK DEMOTING SCHEMES IN A CACHE MANAGEMENT SYSTEM OF A STORAGE CONTROLLER

(71) Applicant: INTERNATIONAL BUSINESS MACHINES CORPORATION, Armonk, NY (US)

(72) Inventors: Lokesh M. Gupta, Tucson, AZ (US); Joseph Hayward, Tucson, AZ (US); Kyler A. Anderson, Sahuarita, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 463 days.

This patent is subject to a terminal disclaimer.

(21) Appl. No.: 17/477,478

(22) Filed: Sep. 16, 2021

(65) Prior Publication Data

US 2022/0004504 A1 Jan. 6, 2022

Related U.S. Application Data

(63) Continuation of application No. 16/019,151, filed on Jun. 26, 2018, now Pat. No. 11,144,474.

(51) Int. Cl.
G06F 12/123 (2016.01)

(52) U.S. Cl.
CPC ...... *G06F 12/123* (2013.01); *G06F 2212/462* (2013.01)

(58) Field of Classification Search
CPC .................. G06F 12/123; G06F 2212/461
(Continued)

(56) References Cited

U.S. PATENT DOCUMENTS 5,606,688 A 2/1997 McNutt et al.
5,649,156 A 7/1997 Vishlitzky et al.
(Continued)

FOREIGN PATENT DOCUMENTS

AU 2015201273 3/2015

OTHER PUBLICATIONS

Notice of Allowance dated Jun. 23, 2022, pp. 6, for U.S. Appl. No. 17/148,250.
(Continued)

*Primary Examiner* — Gautam Sain
(74) *Attorney, Agent, or Firm* — KONRAD, RAYNES, DAVDA & VICTOR LLP; Rabindranath Dutta

(57) ABSTRACT

A computational device receives an indication that specifies a maximum retention time in cache for a first plurality of tracks, wherein no maximum retention time is specified for a second plurality of tracks. A plurality of insertions points are generated in a least recently used (LRU) list, wherein different insertion points in the LRU list correspond to different amounts of time that a track of the first plurality of tracks is expected to be retained in the cache, wherein the LRU list is configured to demote both tracks of the first plurality of tracks and the second plurality of tracks from the cache.

18 Claims, 11 Drawing Sheets

(58) Field of Classification Search
USPC .......................................................... 711/136
See application file for complete search history.

(56) References Cited

U.S. PATENT DOCUMENTS

| | | | |
|---|---|---|---|
| 6,728,837 B2 | 4/2004 | Wilkes | |
| 6,745,295 B2 | 6/2004 | Rodriguez | |
| 6,842,826 B1* | 1/2005 | McNutt | G06F 12/123 |
| | | | 711/E12.072 |
| 8,533,393 B1 | 9/2013 | Cote et al. | |
| 8,838,903 B2 | 9/2014 | Caulkins | |
| 9,158,671 B2 | 10/2015 | Ryu et al. | |
| 9,189,423 B2 | 11/2015 | Hsu | |
| 9,460,025 B1 | 10/2016 | Wallace et al. | |
| 9,734,066 B1 | 8/2017 | Indupuru et al. | |
| 11,061,826 B2 | 7/2021 | Gupta et al. | |
| 11,068,413 B2 | 7/2021 | Gupta et al. | |
| 11,068,417 B2 | 7/2021 | Gupta et al. | |
| 2008/0046655 A1* | 2/2008 | Bhanoo | G06F 16/9574 |
| | | | 707/E17.12 |
| 2009/0037660 A1 | 2/2009 | Fairhurst | |
| 2012/0226871 A1* | 9/2012 | Cantin | G06F 12/123 |
| | | | 711/135 |
| 2013/0097387 A1* | 4/2013 | Sanchez Martin | G06F 12/0862 |
| | | | 711/E12.042 |
| 2013/0111146 A1 | 5/2013 | Ash et al. | |
| 2013/0246691 A1 | 9/2013 | Benhase et al. | |
| 2013/0297885 A1 | 11/2013 | Hyde et al. | |
| 2014/0181414 A1 | 6/2014 | Eckert et al. | |
| 2014/0330817 A1 | 11/2014 | Eleftheriou et al. | |
| 2015/0074355 A1* | 3/2015 | Sampathkumar | G06F 12/123 |
| | | | 711/135 |
| 2015/0378924 A1 | 12/2015 | Brandt et al. | |
| 2017/0052898 A1 | 2/2017 | Ash et al. | |
| 2017/0060764 A1 | 3/2017 | Shetty et al. | |
| 2017/0124001 A1 | 5/2017 | Ash et al. | |
| 2017/0300426 A1 | 10/2017 | Chai et al. | |
| 2017/0344493 A1 | 11/2017 | Ash et al. | |
| 2018/0081811 A1 | 3/2018 | Al Sheikh et al. | |
| 2019/0391923 A1 | 12/2019 | Gupta et al. | |
| 2019/0391930 A1 | 12/2019 | Gupta et al. | |
| 2019/0391931 A1 | 12/2019 | Gupta et al. | |
| 2019/0391932 A1 | 12/2019 | Gupta et al. | |
| 2019/0391933 A1 | 12/2019 | Gupta et al. | |
| 2021/0133116 A1 | 5/2021 | Gupta et al. | |
| 2021/0133120 A1 | 5/2021 | Gupta et al. | |
| 2021/0141739 A1 | 5/2021 | Gupta et al. | |

OTHER PUBLICATIONS

Office Action dated Jul. 11, 2022, pp. 20, for U.S. Appl. No. 17/148,217.
Notice Allowance dated Jul. 27, 2022, pp. 17, for U.S. Appl. No. 17/152,727.
Response dated Oct. 11, 2022, 9pp., to Office Action dated Jul. 11, 2022, pp. 20, for U.S. Appl. No. 17/148,250.
Notice of Allowance dated Nov. 17, 2022, 39pp., for U.S. Appl. No. 17/148,250.
Office Action dated Feb. 16, 2022, pp. 25, for U.S. Appl. No. 17/148,250.
Office Action dated Mar. 1, 2022, pp. 25, for U.S. Appl. No. 17/152,727.
List of IBM patents and applications treated as related, dated Mar. 10, 2022, pp. 2.
Response dated Jun. 1, 2022, pp. 9, to Office Action dated Mar. 1, 2022, pp. 25, for U.S. Appl. No. 17/152,727.
Response dated May 16, 2022, pp. 9, to Office Action dated Feb. 16, 2022, pp. 25, for U.S. Appl. No. 17/148,250.
U.S. Appl. No. 16/019,196, filed Jun. 26, 2018.
Notice of Allowance dated Jan. 23, 2020, pp. 21, for U.S. Appl. No. 16/019,196.
Notice of Allowance dated Apr. 23, 2020, pp. 13, for U.S. Appl. No. 16/019,196.
Notice of Allowance dated Aug. 5, 2020, pp. 13 for U.S. Appl. No. 16/019,196.
Notice of Allowance dated Dec. 16, 2020, pp. 17, for U.S. Appl. No. 16/019,196.
Notice of Allowance dated Mar. 17, 2021, pp. 13, for U.S. Appl. No. 16/019,196.
List of IBM Patents or Patent Applications Treated as Related, pp. 2, dated Sep. 2021.
Jimenez, DA.; "Insertion and Promotion for Tree-Based PseudoLRU Last-Level Caches"; Micro-46; Dec. 7, 2013, pp. 13.
Paajanen, H.; "Page Replacement in Operating System Memory Management"; Master's Thesis in Information Technology; University of Jyvaskyia; Oct. 23, 2007, pp. 109.
"High Performance Cache with LRU Replacement Policy"; IP.com, http://ip.com/IPCOM/000196714D; Jun. 12, 2010, pp. 20.
Anonymously; "Regioned Least Recently Used Destage Algorithm"; IP.com, http://ip.com/IPCOM/000205106D; Mar. 15, 2011, pp. 3.
Anonymously; "Dynamic Cache Reservation for Virtual Machine Applications in Cloud", IP.com, http://ip.com/IPCOM/000233167D; Nov. 28, 2013, pp. 7.
Hameed, F., et al., "Dynamic cache management in multi-core architectures through run-time adaptation". In Design, Automation Test in Europe Conference Exhibition, IEEE, Mar. 2012, pp. 485-490.
Fan, Z., "Improving Storage Performance with Non-Volatile Memory-based Caching Systems" 2017, pp. 117 (Doctoral dissertation, University of Minnesota).
U.S. Appl. No. 16/019,151, filed Jun. 26, 2018.
Office Action dated Jan. 17, 2020, pp. 28, for U.S. Appl. No. 16/019,151.
Response dated Apr. 17, 2020, pp. 14, to Office Action dated Jan. 17, 2020, pp. 28, for U.S. Appl. No. 16/019,151.
Final Office Action dated Jun. 1, 2020, pp. 42, for U.S. Appl. No. 16/019,151.
Response dated Aug. 3, 2020, pp. 14, to Final Office Action dated Jun. 1, 2020, pp. 42, for U.S. Appl. No. 16/019,151.
Advisory Action dated Aug. 11, 2020, pp. 6, for U.S. Appl. No. 16/019,151.
Amendment dated Sep. 1, 2020, pp. 16, to Final Office Action dated Jun. 1, 2020, pp. 42, for U.S. Appl. No. 16/019,151.
Office Action dated Jan. 29, 2021, pp. 28, for U.S. Appl. No. 16/019,151.
Response dated Apr. 29, 2021, pp. 16, to Office Action dated Jan. 29, 2021, pp. Notice of Allowance dated Jul. 6, 2021, pp. 22, for U.S. Appl. No. 16/019,151.
U.S. Appl. No. 16/019,160, filed Jun. 26, 2018.
Office Action dated Sep. 6, 2019, pp. 31, for U.S. Appl. No. 16/019,160.
Response dated Dec. 6, 2019, pp. 11, to Office Action dated Sep. 6, 2019, pp. 31, for U.S. Appl. No. 16/019,160.
Final Office Action dated Jan. 23, 2020, pp. 26, for U.S. Appl. No. 16/019,160, filed Jun. 26, 2018.
Response dated Apr. 23, 2020, pp. 13, to Final Office Action dated Jan. 23, 2020, pp. 26, for U.S. Appl. No. 16/019,160.
Office Action dated Aug. 7, 2020 pp. 24, for U.S. Appl. No. 16/019,160.
Response dated Nov. 9, 2020 pp. 15 to Office Action dated Aug. 7, 2020 pp. 24, for U.S. Appl. No. 16/019,160.
Notice of Allowance dated Dec. 2, 2020, pp. 34, for U.S. Appl. No. 16/019,160.
Notice of Allowance dated Mar. 10, 2021, pp. 16, for U.S. Appl. No. 16/019,160.
U.S. Appl. No. 17/148,217, filed Jan. 13, 2021.
Preliminary Amendment dated Jan. 13, 2021, for U.S. Appl. No. 7/148,250.
U.S. Appl. No. 16/019,163, filed Jun. 26, 2018.
Office Action dated Dec. 23, 2019, pp. 24, for U.S. Appl. No. 16/019,163.
Response dated Mar. 23, 2020, pp. 10, to Office Action dated Dec. 23, 2019, pp. 24, for U.S. Appl. No. 16/019,163.

(56) References Cited

OTHER PUBLICATIONS

Notice of Allowance dated May 12, 2020, pp. 21, for U.S. Appl. No. 16/019,163.
Notice of Allowance dated Jul. 23, 2020, pp. 9, for U.S. Appl. No. 16/019,163.
Notice of Allowance dated Nov. 12, 2020, pp. 13, for U.S. Appl. No. 16/019,163.
Notice of Allowance dated Mar. 10, 2021, pp. 10, for U.S. Appl. No. 16/019,163.
U.S. Appl. No. 17/148,250, filed Jan. 13, 2021.
Preliminary Amendment dated Jan. 13, 2021, for U.S. Appl. No. 17/148,250.
U.S. Appl. No. 16/019,173, filed Jun. 26, 2018.
Office Action dated Dec. 12, 2019, pp. 14, for U.S. Appl. No. 16/019,173.
Response dated Mar. 12, 2020, pp. 11, to Office Action dated Dec. 12, 2019, pp. 14, for U.S. Appl. No. 16/019,173.
Notice of Allowance dated May 13, 2020, pp. 26, for U.S. Appl. No. 16/019,173.
Notice of Allowance dated Jul. 15, 2020, pp. 10, for U.S. Appl. No. 16/019,173.
Notice of Allowance dated Nov. 19, 2020, pp. 29, for U.S. Appl. No. 16/019,173.
Notice of Allowance dated Mar. 12, 2021, pp. 13, for U.S. Appl. No. 16/019,173.
U.S. Appl. No. 17/152,727, filed Jan. 19, 2021.
Preliminary Amendment dated Jan. 19, 2021, for U.S. Appl. No. 17/152,727.

\* cited by examiner

INTEGRATION OF APPLICATION INDICATED MAXIMUM TIME TO CACHE TO LEAST RECENTLY USED TRACK DEMOTING SCHEMES IN A CACHE MANAGEMENT SYSTEM OF A STORAGE CONTROLLER

CROSS-REFERENCE TO RELATED APPLICATION

This application is a continuation of U.S. patent application Ser. No. 16/019,151, filed Jun. 26, 2018, which application is incorporated herein by reference in its entirety.

BACKGROUND

1. Field

Embodiments relate to the integration of application indicated maximum time to cache to least recently used track demoting schemes in a cache management system of a storage controller.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. In a least recently used (LRU) cache replacement policy, the least recently used items are discarded first.

U.S. Pat. No. 6,842,826 at least discusses use of management of LRU algorithm insertion points corresponding to defined times in cache. U.S. Pat. No. 5,606,688 at least discusses dynamic cache memory allocation via single-reference residency times.

SUMMARY OF THE PREFERRED EMBODIMENTS

Provided are a method, system, and computer program product in which a computational device receives an indication that specifies a maximum retention time in cache for a first plurality of tracks, wherein no maximum retention time is specified for a second plurality of tracks. A plurality of insertions points are generated in a least recently used (LRU) list, wherein different insertion points in the LRU list correspond to different amounts of time that a track of the first plurality of tracks is expected to be retained in the cache, wherein the LRU list is configured to demote both tracks of the first plurality of tracks and the second plurality of tracks from the cache. As a result, maximum retention times for tracks are incorporated with LRU based cache replacement mechanisms to empty unneeded tracks from the cache faster in comparison to mechanisms in which maximum retention times for tracks are not incorporated with LRU based cache replacement mechanisms.

In additional embodiments, in response to determining that a track is of the first plurality of tracks, a determination is made of an insertion point whose corresponding amount of time is closest to a maximum retention time for the track of the first plurality of tracks. The determined track is added to the determined insertion point. As a result, tracks are placed at the proper position in a LRU list.

In further embodiments, in response to adding the determined track to the determined insertion point, insertion points are moved by one track to accommodate the adding of the determined track. As a result, the future insertions of tracks are possible at proper insertion points.

In yet further embodiments, in response to the moving of the insertion points, a new insertion point is added to a most recently used (MRU) end of the LRU list if a list size of the LRU list is a multiple of an insertion interval size, wherein the insertion interval size indicates how many tracks are included in a partition of tracks corresponding to an insertion point, based at least on rate of demotion of tracks from the cache and a number of tracks in the cache. As a result, the insertion points are tailored based on demotion rates of tacks.

In certain embodiments, in response to removing a track from the LRU list, insertion points are adjusted in the LRU list. As a result, the future insertions of tracks are possible at proper insertion points.

In additional embodiments, in response to determining that a track is of the second plurality of tracks, the determined track of the second plurality of tracks is added to a most recently used (MRU) end of the LRU list. As a result, tracks that do not have maximum retention time are processed in accordance with LRU based replacement policies.

In yet additional embodiments, a cache management application performs a LRU based replacement of tracks in the cache, wherein the cache management application retains the first plurality of tracks in the cache for no more than the maximum retention time while performing the LRU based replacement of tracks in the cache. As a result, maximum retention time for tracks is integrated into LRU based cache replacement policies.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A cache replacement policy in a storage controller may be LRU based. In a conventional LRU based mechanism, a track upon being accessed is added to a most recently used (MRU) end of a LRU list. As the track ages (i.e., is not used) the track moves to the LRU end of the LRU list and then gets demoted (i.e., discarded or removed) from the cache.

In certain embodiments, an application may provide indications to a storage controller to store tracks used by the application for a maximum period of time in the cache, where the maximum period of time is referred to as a maximum retention time. The application is unlikely to reaccess (i.e., access once again) the track after the maximum retention time, so it is desirable to demote the track from the cache after the expiry of the maximum retention time to free up space in the cache. The indications provided by the application may be regarded as a hint provided to a cache management application for improving the efficiency of cache replacement policies.

If the maximum retention time is not specified by the application then the cache management application uses the conventional LRU based mechanism to age out the track. If a plurality of applications indicate different maximum retention times then it is desirable for the cache management application to incorporate the different maximum retention times with the conventional LRU based mechanisms.

Certain embodiments provide improvements to computer technology, by integrating application indicated maximum retention time for tracks to LRU based track demoting schemes in a cache management system of a storage controller. As a result, caching operations in a storage controller takes account of hints (i.e., indications) provided by an application to not retain certain tracks in cache beyond a maximum amount of time. A LRU list is augmented such that a plurality of insertions points are generated in the LRU list, wherein different insertion points in the LRU list correspond to different amounts of time that a track is expected to be retained in the cache. While inserting tracks that have a maximum retention time, the insertion points are adjusted in the LRU list to accommodate the inserted track. While removing tracks, the insertion points are adjusted in the LRU list after the removal of the tracks.

Exemplary Embodiments

Figure 1:
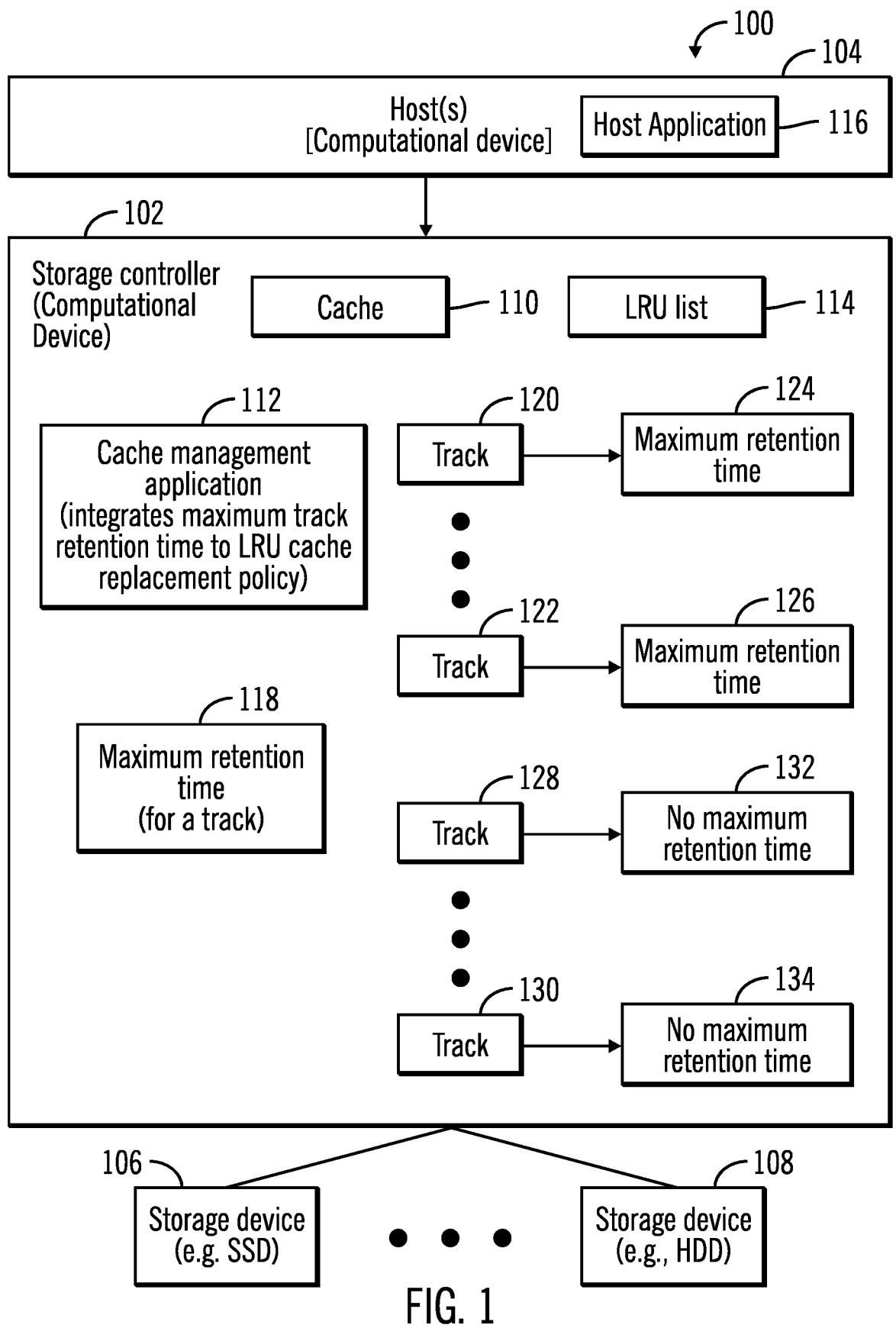
FIG. 1 illustrates a block diagram of a computing environment comprising a storage controller coupled to one or more hosts and one or more storage devices, in accordance with certain embodiments.

FIG. 1 illustrates a block diagram of a computing environment 100 comprising a storage controller 102 coupled to one or more hosts 104 and one or more storage devices 106, 108, in accordance with certain embodiments.

The storage controller 102 allows the one or more hosts 104 to perform input/output (I/O) operations with logical storage maintained by the storage controller 102. The physical storage corresponding to the logical storage may be found in one or more of the storage devices 106, 108 and/or a cache 110 of the storage controller 102.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores.

The storage controller 102 and the one or more hosts 104 may be elements in any suitable network, such as, a storage area network, a wide area network, the Internet, an intranet. In certain embodiments, storage controller 102 and the one or more hosts 104 may be elements in a cloud computing environment.

The cache 110 may be any suitable cache known in the art or developed in the future. In some embodiments, the cache 110 may be implemented with a volatile memory and/or non-volatile memory. The cache 110 may store both modified and unmodified data, where a cache management application 112 may periodically demote (i.e., move) data from the cache 110 to storage devices 106, 108 controlled by the storage controller 102. In certain embodiments, cache management application 112 may be implemented in software, firmware, hardware or any combination thereof.

The plurality of storage devices 106, 108 may be comprised of any storage devices known in the art. For example, the storage device 106 may be a solid state drive (SSD) and the storage device 108 may be a hard disk drive (HDD).

A LRU list 114 is maintained in the storage controller 102 by the cache management application 112. The cache management application 112 receives indications from one or more host applications on whether tracks used by the host application 116 should be demoted from the cache 110 after a time duration referred to as a maximum retention time 118. A plurality of tracks 120, 122 may have maximum retention times 124, 126 indicated by host applications. Another plurality of tracks 128, 130 may have no indications of maximum retention time (as shown via reference numerals 132, 134). The LRU list 114 may include some of the plurality of tracks 120, 122 and some of the plurality of tracks 128, 130, i.e., the LRU list 114 includes tracks in the cache 110 with maximum retention time and tracks in the cache 110 without maximum retention time. It should be noted that each track stored in the cache 110 is indicated in the LRU list 114, and the LRU list 114 is used by the cache management application 112 to determine which tracks to demote from the cache 110.

In certain embodiments, the cache management application 112 demotes tracks from the cache 110 by taking into account the LRU list 114 in which insertion points are included to add tracks with maximum retention time. An attempt is made by the cache management application 112 to utilize the hints on maximum retention time requirements while demoting from the cache.

Figure 2:
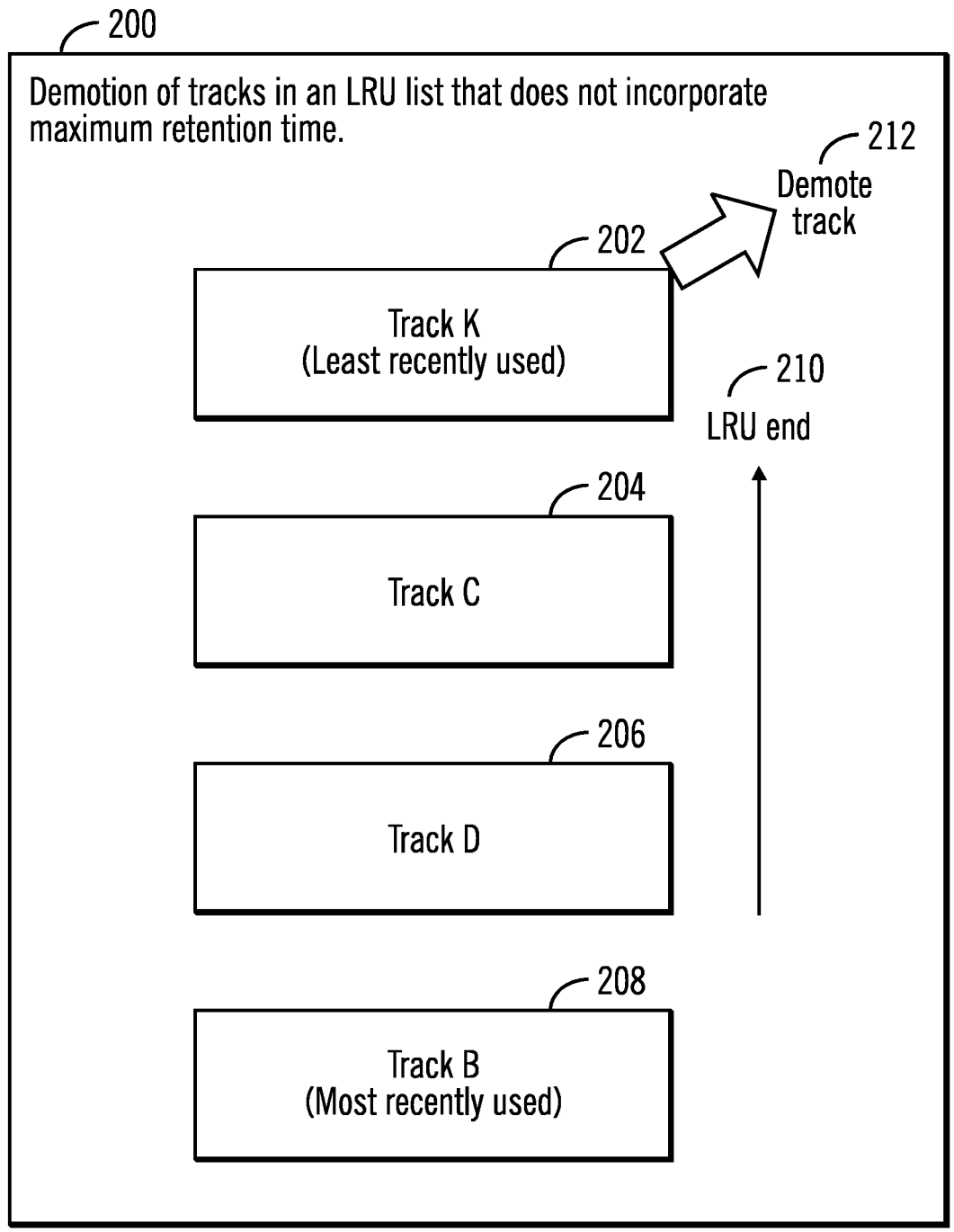
FIG. 2 illustrates a block diagram that shows demotion of tracks from an LRU list that does not incorporate a maximum retention time for selected tracks, in accordance with certain embodiments.

FIG. 2 illustrates a block diagram 200 that shows demotion of tracks from a LRU list that does not incorporate a maximum retention time for selected tracks, in accordance with certain embodiments.

For simplicity, only four tracks, denoted as track K 202, track C 204, track D 206, and track B 208 are shown in FIG. 2, although a typical LRU list may have thousands or tens of thousands of tracks.

The LRU end of the list is towards the top (as shown via reference numeral 210). As a result, track K 202 is the least recently used track, and track B 208 is the most recently used track. Track K 202 which is the least recently used track is demoted first in a conventional LRU based cache replacement policy (as shown via reference numeral 212).

Figure 3:
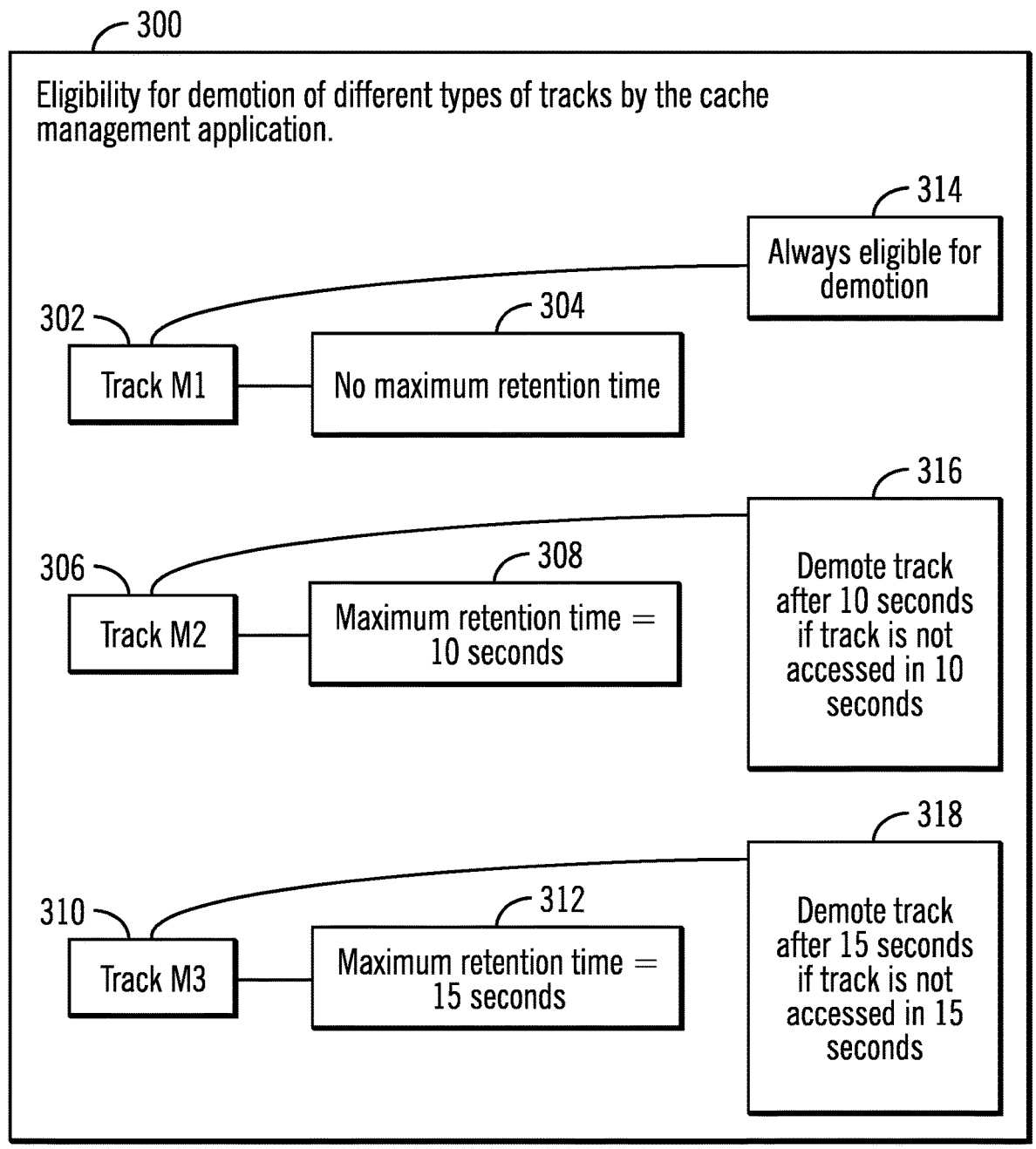
FIG. 3 illustrates a block diagram that shows the eligibility for demotion of different types of tracks, in accordance with certain embodiments.

FIG. 3 illustrates a block diagram 300 that shows the eligibility for demotion of different types of tracks in a cache 110, in accordance with certain embodiments.

Track M1 302 has no maximum retention time 304 indicated by the host application 116. As a result track M1 302 is always eligible for demotion when track M1 302 reaches the LRU end of the LRU list 114 (as shown via reference numeral 314).

Track M2 306 has a maximum retention time 308 of 10 seconds indicated by the host application 116. As a result track M2 306 should be demoted if track M2 306 is in cache beyond 10 seconds without being accessed (as shown via reference numeral 316).

Track M3 310 has a maximum retention time 312 of 15 seconds indicated by the host application 116. As a result track M3 310 should be demoted if track M3 310 is in cache beyond 15 seconds without being accessed (as shown via reference numeral 318).

Figure 4:
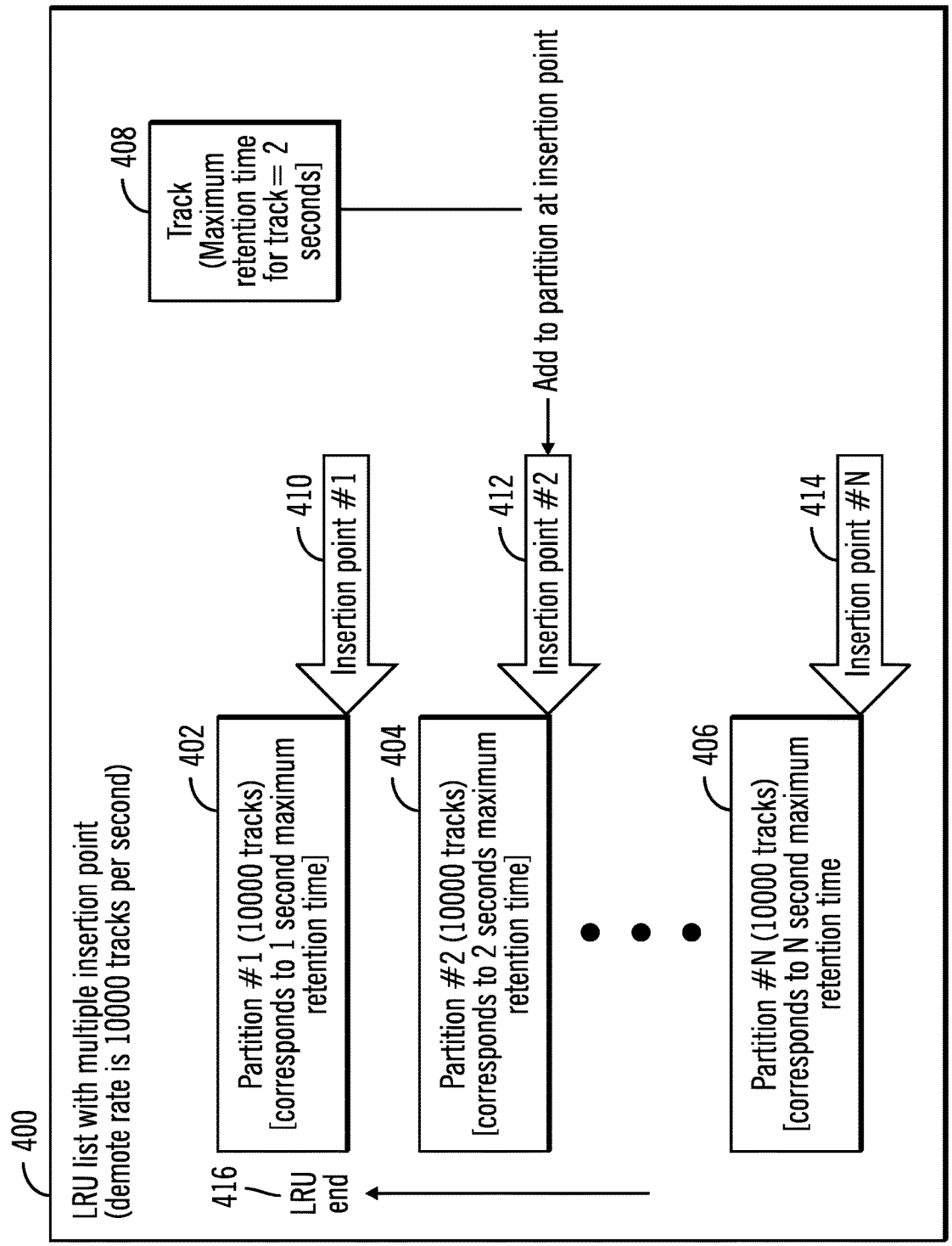
FIG. 4 illustrates a block diagram that shows a LRU list with multiple insertion points, in accordance with certain embodiments.

FIG. 4 illustrates a block diagram 400 that shows a LRU list with multiple insertion points, in accordance with certain embodiments.

In certain embodiments, an exemplary demote rate is 10000 tracks per second, i.e., 10000 tracks are on an average demoted from the cache every second. In such embodiments, the tracks on the LRU list are partitioned into a plurality of partitions 402, 404, 406 where each partition includes 10000 tracks and insertion points 410, 412, 414 for new tracks to be added are at the end of each partition.

In FIG. 4, partition #1 402 corresponds to a maximum retention time of 1 seconds, partition #2 404 corresponds to a maximum retention time of 2 seconds, and partition #N 406 corresponds to ta maximum retention time of N seconds. The lowest retention time is towards the LRU end of the LRU list as shown via reference numeral 416.

If a track with a maximum retention time of 2 seconds needs to be inserted into the LRU list then the track is added to the insertion point #2 412 (as shown via reference numbers 408, 410).

Therefore, FIG. 4 shows how a LRU list has multiple insertion points corresponding to different amounts of time a track has been retained in the cache since the last access of the track, and how a track with a maximum retention time is inserted into the LRU list. It should be noted that when a track is inserted then some of the insertion points may need to be adjusted. For example on inserting track 408, the insertion point #2 412 moves one track vertically downwards in FIG. 4, as partition #2 404 would have 10001 tracks after insertion of track 408.

Figure 5:
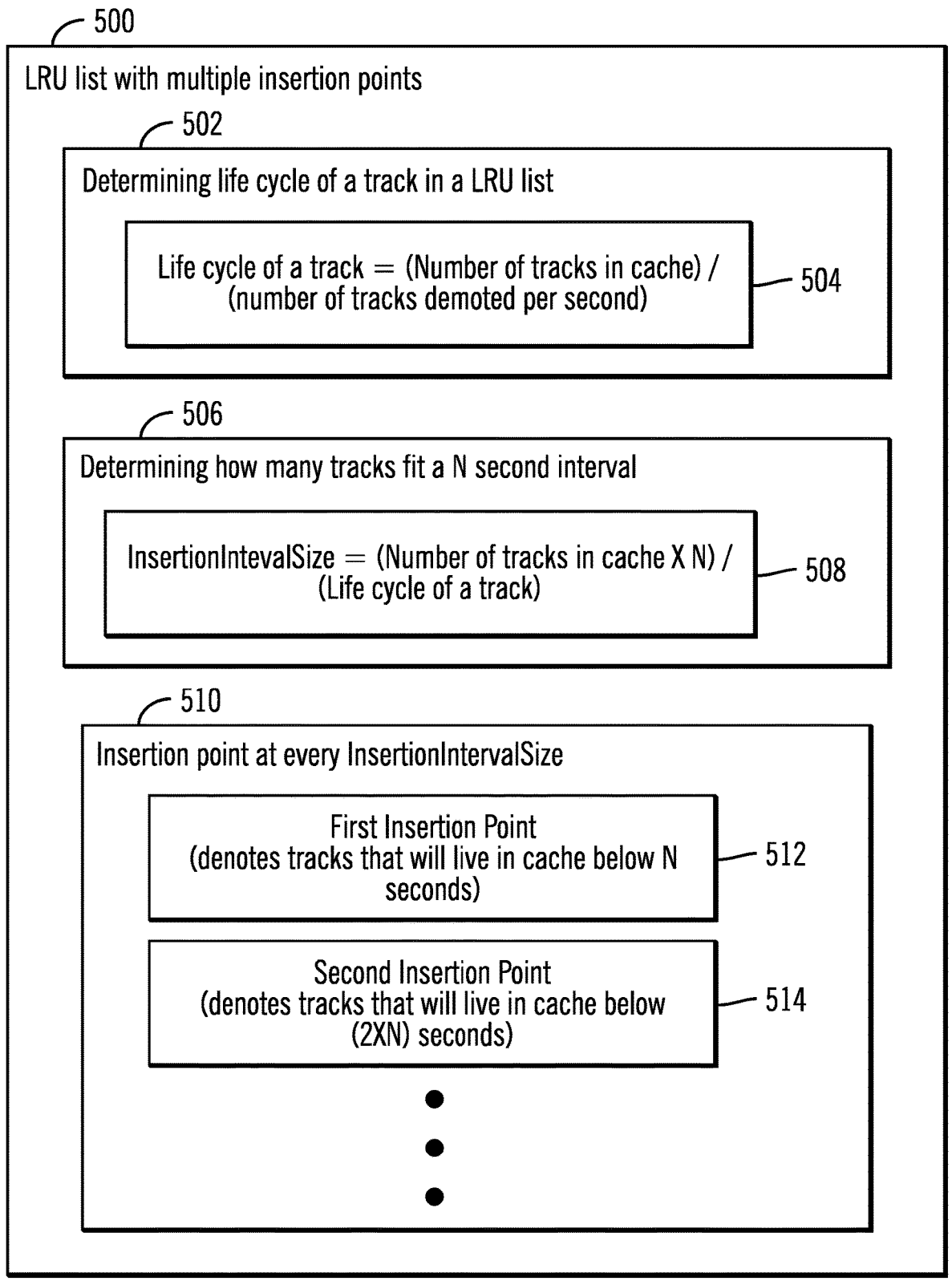
FIG. 5 illustrates a block diagram that shows how a LRU list with multiple insertion points is generated, in accordance with certain embodiments.

FIG. 5 illustrates a block diagram 500 that shows how a LRU list with multiple insertion points is generated, in accordance with certain embodiments.

The cache management application 112 determines the life cycle of a track in a LRU list (as shown via reference numerals 502, 504). This may be performed via different mechanisms. One mechanism is to determine the demote rate and then use the demote rate and cache size to find out the approximate life cycle of a track via the following calculation: Life cycle of a track=(Number of tracks in cache)/(number of tracks demoted per second).

Then the cache management application 112 determines how many tracks fit in a N second interval (referred to as InsertionIntervalSize) as follows: InsertionIntervalSize= (Number of tracks in cache×N)/(Life cycle of a track) [as shown via reference numerals 506, 508].

There is an insertion point at every InsertionIntervalSize (as shown via reference numeral 512). The first insertion point 512 denotes tracks that will be retained in cache below N seconds. Second insertion point 514 denotes tracks that will be retained in cache below 2×N seconds, and so on.

Figure 6:
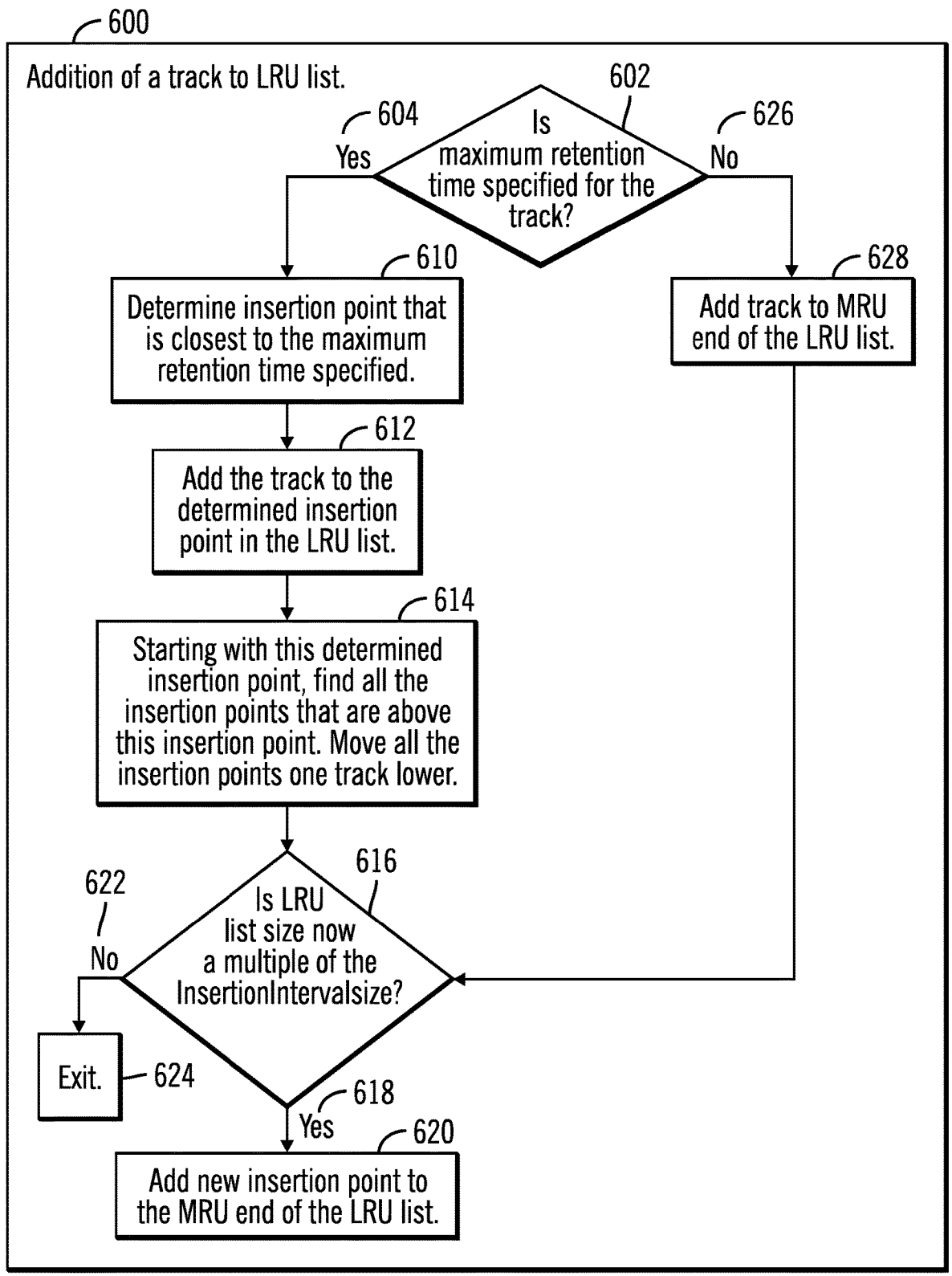
FIG. 6 illustrates a flowchart that shows the addition of a track to a LRU list, in accordance with certain embodiments.

FIG. 6 illustrates a flowchart 600 that shows the addition of a track to a LRU list 114, in accordance with certain embodiments. The operations shown in FIG. 6 may be performed by the cache management application 112 that executes in the storage controller 102.

Control starts at block 602 in which the cache management application 112 determines whether a maximum retention time is specified for a track that is to be added to the LRU list 114. If so ("Yes" branch 604) control proceeds to block 610 in which the cache management application 112 determines the insertion point that is closest to the maximum retention time specified. The cache management application 112 adds (at block 612) the track to the determined insertion point in the LRU list 114.

From block 612 control proceeds to block 614 in which the cache management application 112 starts with the determined insertion point and finds all the insertion points that are above (i.e., have time durations for insertion that are more) the insertion point. The cache management application 112 moves all the insertion points one track lower (where lower corresponds to movement of the insertion point towards tracks that are expected to be longer in the cache).

The cache management application 112 then determines (at block 616) whether the LRU list size is a multiple of the InsertionIntervalSize. If so ("Yes" branch 618) control proceeds to block 620 where a new insertion point is added to the MRU end of the LRU list 114 (For example, if InsertionIntervalSize is 10000 and the size of the LRU list becomes 20000, then a new insertion point may be added at the MRU end). If not ("No" branch 622), the process exits (at block 624).

If at block 602 the cache management application 112 determines that the track does not have a maximum retention time ("No" branch 626) then control proceeds to block where the track is added to the MRU end of the LRU list 114. For example, InsertionIntervalSize is 10000 and the size of the LRU list becomes 20000, then a new insertion point is added at the MRU end.

Therefore, FIG. 6 illustrates certain embodiments for adding tracks to the LRU list 114.

Figure 7:
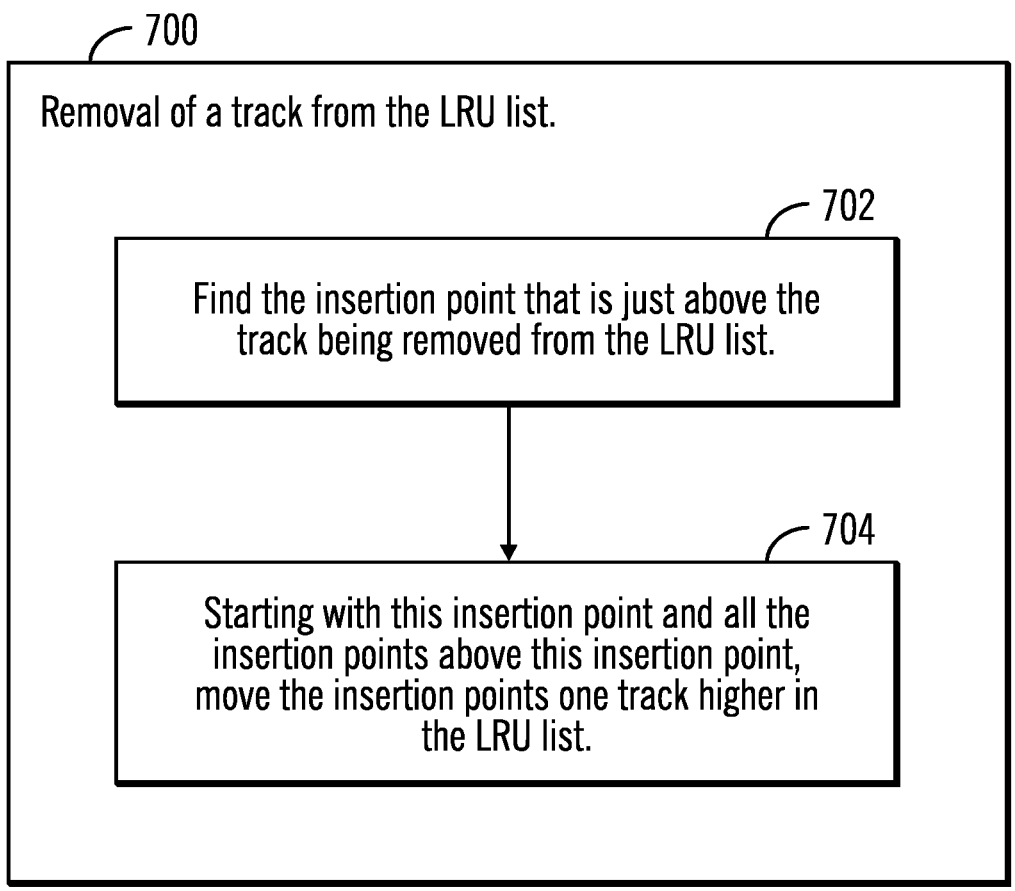
FIG. 7 illustrates a flowchart that shows the removal of a track to a LRU list, in accordance with certain embodiments.

FIG. 7 illustrates a flowchart 700 that shows the removal of a track to a LRU list, in accordance with certain embodiments. The operations shown in FIG. 7 may be performed by the cache management application 112 that executes in the storage controller 102.

Control starts at block 702 in which the cache management application 112 finds the insertion point that is just above the track being removed from the LRU list 114. Every track has a timestamp in the LRU list. The timestamp may be compared with the insertion points to find the insertion point just above the track being removed. Starting with the insertion point and all the insertion points above the insertion point, the cache management application 112 moves the insertion points one track higher in the LRU list 114.

Therefore, FIG. 7 illustrates certain embodiments to remove tracks from the LRU list 114.

Figure 8:
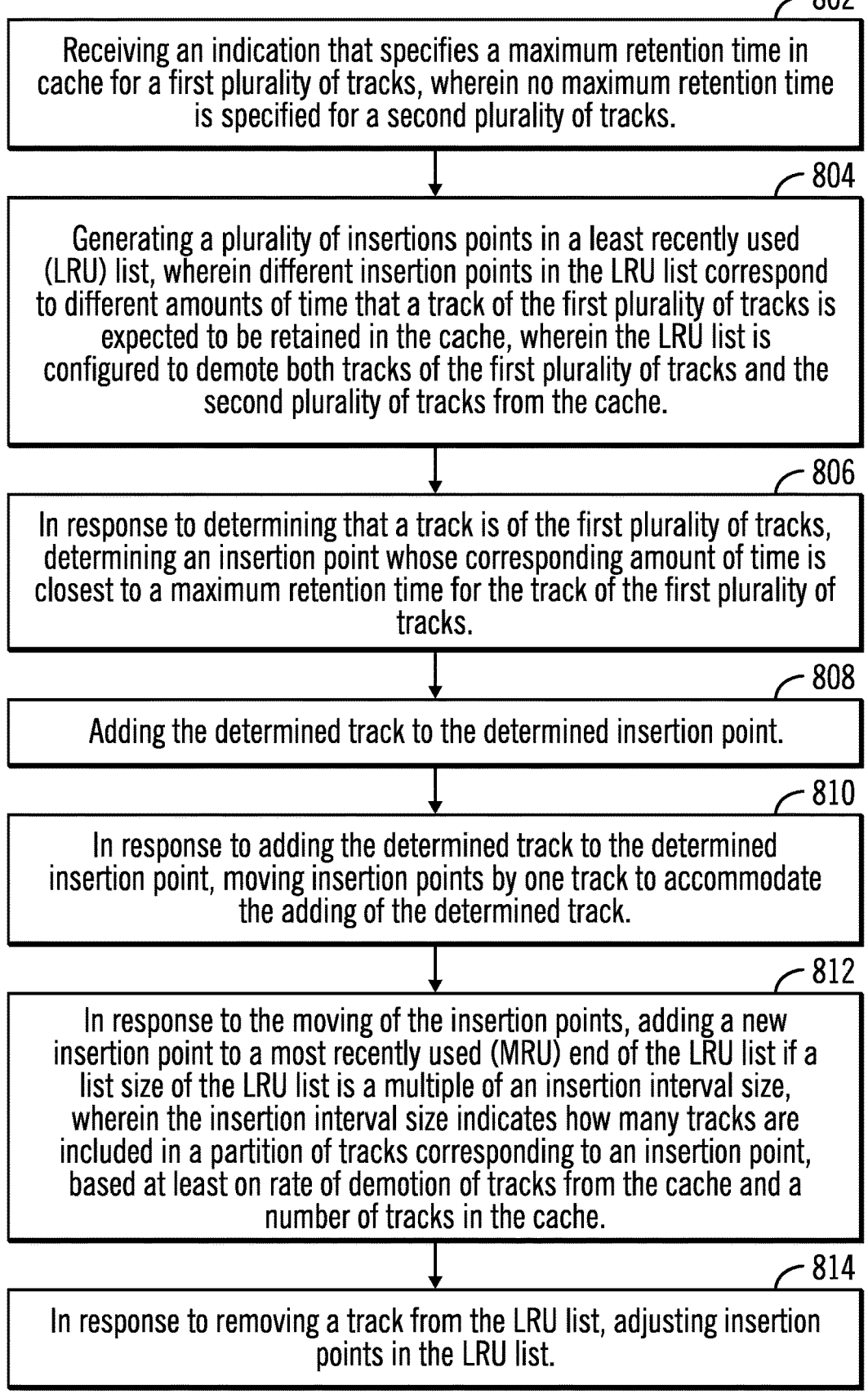
FIG. 8 illustrates a flowchart that shows how maximum retention time of tracks are integrated with least recently used (LRU) based cache replacement policies, in accordance with certain embodiments.

FIG. 8 illustrates a flowchart that shows how maximum retention time of tracks are integrated with least recently used (LRU) based cache replacement policies, in accordance with certain embodiments. The operations shown in FIG. 8 may be performed by the cache management application 112 that executes in the storage controller 102.

Control starts at block 802 in which a computational device 102 receives an indication that specifies a maximum retention time in cache 110 for a first plurality of tracks, wherein no maximum retention time is specified for a second plurality of tracks. A plurality of insertions points are generated (at block 804) in a least recently used (LRU) list 114, wherein different insertion points in the LRU list correspond to different amounts of time that a track of the first plurality of tracks is expected to be retained in the cache, wherein the LRU list 114 is configured to demote both tracks of the first plurality of tracks and the second plurality of tracks from the cache.

From block 804 control proceeds to block 806 in which, in response to determining that a track is of the first plurality of tracks, a determination is made of an insertion point whose corresponding amount of time is closest to a maximum retention time for the track of the first plurality of tracks. The determined track is added to the determined insertion point (at block 808).

In response to adding the determined track to the determined insertion point, insertion points are moved by one track to accommodate the adding of the determined track (at block 810).

From block 810 control proceeds to block 812 where in response to the moving of the insertion points, a new insertion point is added to a most recently used (MRU) end of the LRU list if a list size of the LRU list is a multiple of an insertion interval size, wherein the insertion interval size indicates how many tracks are included in a partition of tracks corresponding to an insertion point, based at least on rate of demotion of tracks from the cache and a number of tracks in the cache 112. In certain embodiments, in response to removing a track from the LRU list, insertion points are adjusted (at block 814) in the LRU list.

Therefore, FIG. 1-8 illustrate certain embodiments to incorporate maximum retention time hints with conventional LRU based cache replacement mechanisms by including insertion points in a LRU list 114.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
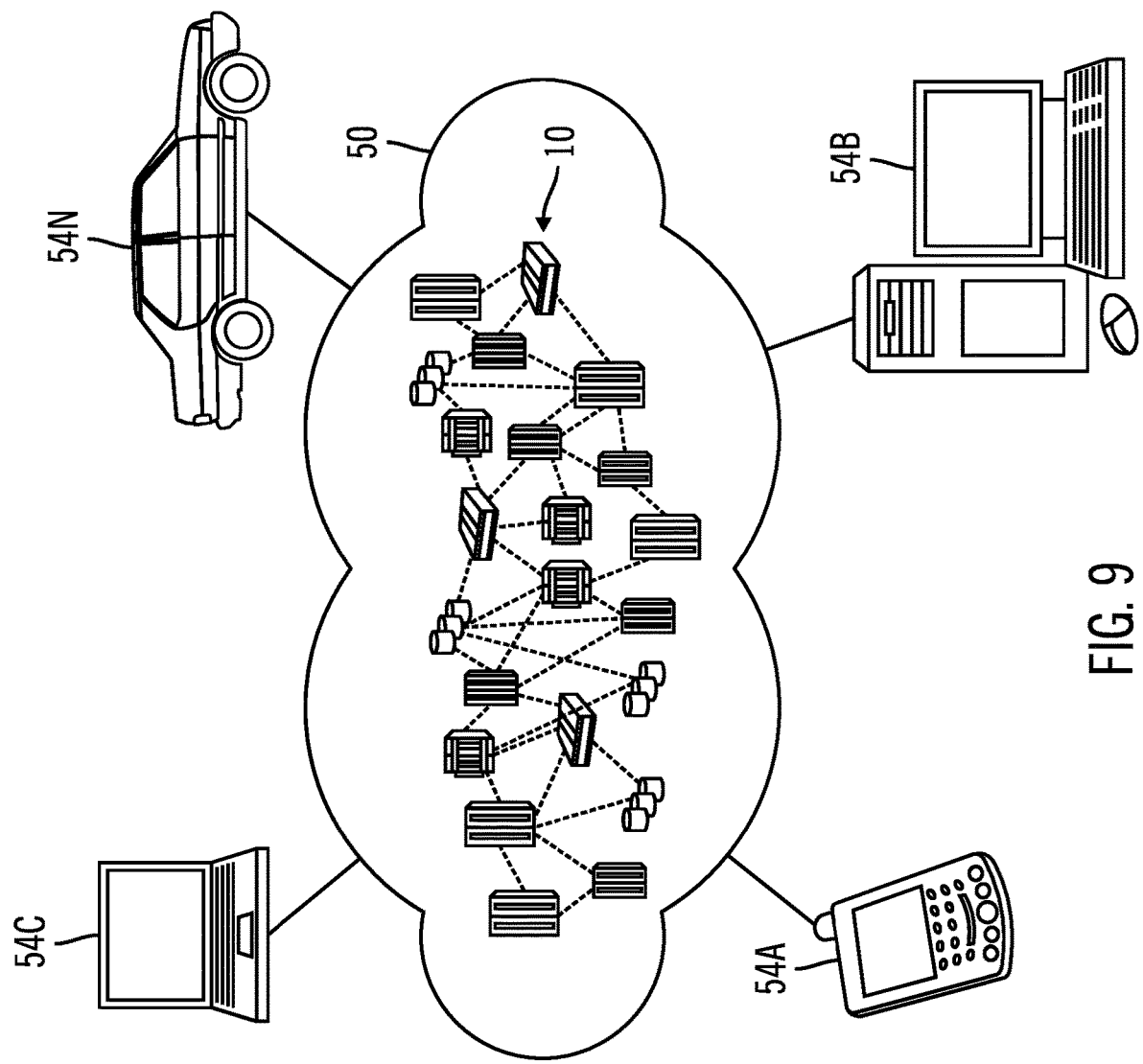
FIG. 9 illustrates a block diagram of a cloud computing environment, in accordance with certain embodiments.

Referring now to FIG. 9 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
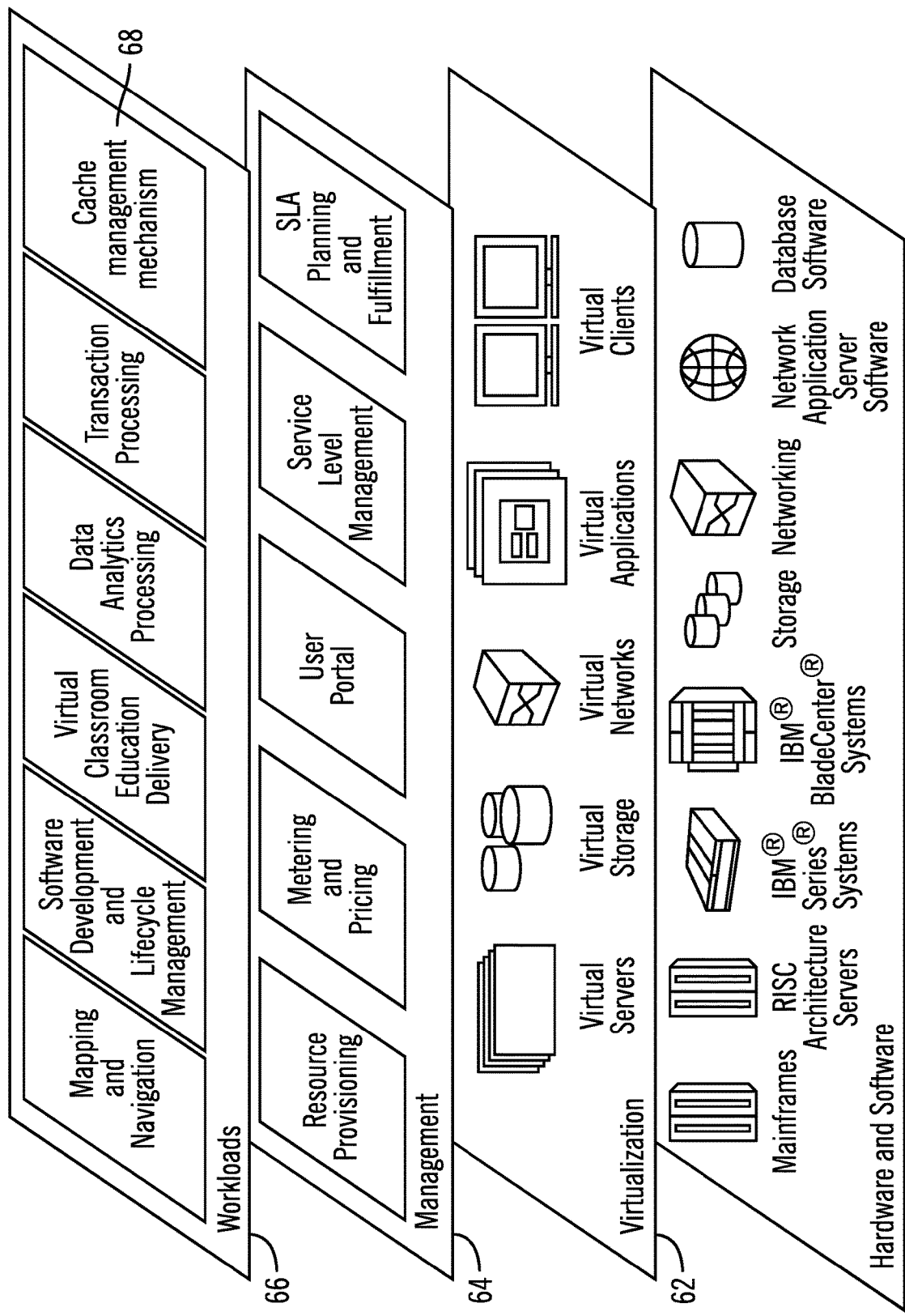
FIG. 10 illustrates a block diagram of further details of the cloud computing environment of FIG. 9, in accordance with certain embodiments.

Referring now to FIG. 10, a set of functional abstraction layers provided by cloud computing environment 50 of FIG. 9 is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cache management mechanism 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
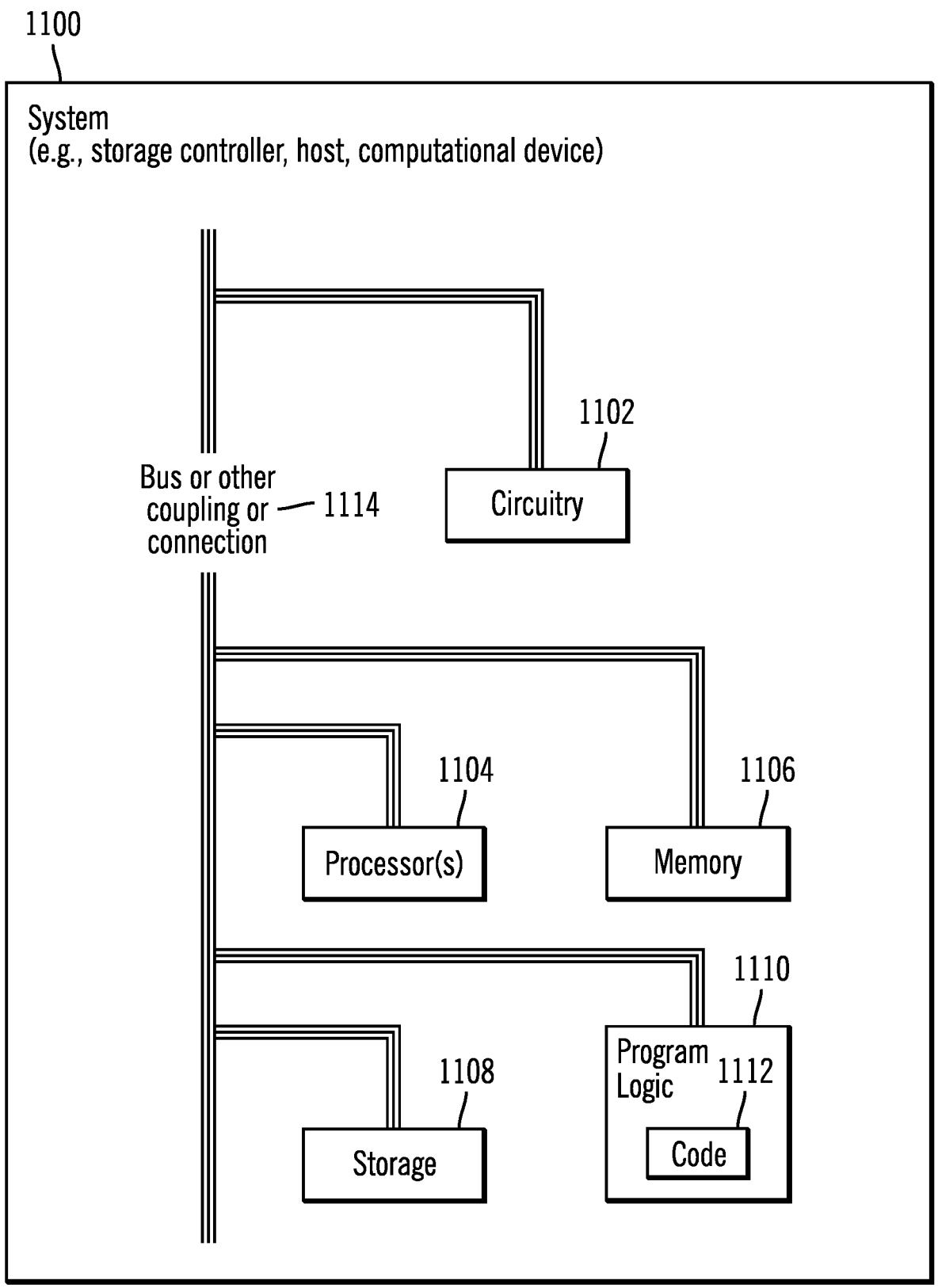
FIG. 11 illustrates a block diagram of a computational system that shows certain elements that may be included in the storage controller or the host, as described in FIGS. 1-9, in accordance with certain embodiments.

FIG. 11 illustrates a block diagram that shows certain elements that may be included in the storage controller 102 or the host 104, or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments.

Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

* IBM, zSeries, pSeries, xSeries, BladeCenter, WebSphere, and DB2 are trademarks of International Business Machines Corporation registered in many jurisdictions worldwide.

What is claimed is:

1. A method, comprising:
   receiving, by a computational device, an indication that specifies a maximum retention time in cache for a first plurality of tracks, wherein no maximum retention time is specified for a second plurality of tracks;
   in response to determining that a track is of the first plurality of tracks, determining an insertion point in a Least Recently Used (LRU) list, wherein the insertion point is closest to the maximum retention time specified for the track of the first plurality of tracks, and adding the track of the first plurality of tracks to the determined insertion point in the LRU list; and
   in response to determining that the track is of the second plurality of tracks, adding the track of the second plurality of tracks to a Most Recently Used (MRU) end of the LRU list.

2. The method of claim 1, the method further comprising:
   in response to adding the track of the first plurality of tracks to the determined insertion point, moving insertion points by one track to accommodate the adding of the track of the first plurality of tracks.

3. The method of claim 2, the method further comprising:
   in response to the moving of the insertion points, adding a new insertion point to the MRU end of the LRU list if a list size of the LRU list is a multiple of an insertion interval size, wherein the insertion interval size indicates how many tracks are included in a partition of tracks corresponding to an insertion point, based at least on rate of demotion of tracks from the cache and a number of tracks in the cache.

4. The method of claim 2, the method further comprising:
   in response to removing another track from the LRU list, adjusting insertion points in the LRU list.

5. The method of claim 1, wherein a cache management application performs a LRU based replacement of tracks in the cache, and wherein the cache management application retains the first plurality of tracks in the cache for no more than the maximum retention time while performing the LRU based replacement of tracks in the cache.

6. The method of claim 1, wherein generating the LRU list with the plurality of insertion points comprises:
   determining a life cycle of one track in the LRU list by dividing a number of tracks in the cache by a number of tracks demoted per a time interval, wherein the life cycle of the one track in the LRU list is indicative of an average amount of time the one track is resident in the cache, the number of tracks demoted per the time interval is a demote rate, and the number of tracks in the cache is indicative of a size of the cache.

7. A system, comprising:
   a memory; and
   a processor coupled to the memory, wherein the processor performs operations, the operations performed by the processor comprising:
      receiving an indication that specifies a maximum retention time in cache for a first plurality of tracks, wherein no maximum retention time is specified for a second plurality of tracks;
      in response to determining that a track is of the first plurality of tracks, determining an insertion point in a Least Recently Used (LRU) list, wherein the insertion point is closest to the maximum retention time specified for the track of the first plurality of tracks, and adding the track of the first plurality of tracks to the determined insertion point in the LRU list; and
      in response to determining that the track is of the second plurality of tracks, adding the track of the second plurality of tracks to a Most Recently Used (MRU) end of the LRU list.

8. The system of claim 7, the operations further comprising:
   in response to adding the track of the first plurality of tracks to the determined insertion point, moving insertion points by one track to accommodate the adding of the track of the first plurality of tracks.

9. The system of claim 8, the operations further comprising:
   in response to the moving of the insertion points, adding a new insertion point to the MRU end of the LRU list if a list size of the LRU list is a multiple of an insertion interval size, wherein the insertion interval size indicates how many tracks are included in a partition of tracks corresponding to an insertion point, based at least on rate of demotion of tracks from the cache and a number of tracks in the cache.

10. The system of claim 8, the operations further comprising:
    in response to removing another track from the LRU list, adjusting insertion points in the LRU list.

11. The system of claim 7, wherein a cache management application performs a LRU based replacement of tracks in the cache, and wherein the cache management application retains the first plurality of tracks in the cache for no more than the maximum retention time while performing the LRU based replacement of tracks in the cache.

12. The system of claim 7, wherein generating the LRU list with the plurality of insertion points comprises:
    determining a life cycle of one track in the LRU list by dividing a number of tracks in the cache by a number of tracks demoted per a time interval, wherein the life cycle of the one track in the LRU list is indicative of an average amount of time the one track is resident in the cache, the number of tracks demoted per the time interval is a demote rate, and the number of tracks in the cache is indicative of a size of the cache.

13. A computer program product, the computer program product comprising a computer readable storage medium having computer readable program code embodied therewith, the computer readable program code configured to perform operations in a computational device, the operations comprising:
    receiving, by the computational device, an indication that specifies a maximum retention time in cache for a first plurality of tracks, wherein no maximum retention time is specified for a second plurality of tracks;
    in response to determining that a track is of the first plurality of tracks, determining an insertion point in a Least Recently Used (LRU) list, wherein the insertion point is closest to the maximum retention time specified for the track of the first plurality of tracks, and adding the track of the first plurality of tracks to the determined insertion point in the LRU list; and
    in response to determining that the track is of the second plurality of tracks, adding the track of the second plurality of tracks to a Most Recently Used (MRU) end of the LRU list.

14. The computer program product of claim 13, the operations further comprising:
    in response to adding the track of the first plurality of tracks to the determined insertion point, moving insertion points by one track to accommodate the adding of the track of the first plurality of tracks.

15. The computer program product of claim 14, the operations further comprising:
in response to the moving of the insertion points, adding a new insertion point to the MRU end of the LRU list if a list size of the LRU list is a multiple of an insertion interval size, wherein the insertion interval size indicates how many tracks are included in a partition of tracks corresponding to an insertion point, based at least on rate of demotion of tracks from the cache and a number of tracks in the cache.

16. The computer program product of claim 14, the operations further comprising:
in response to removing another track from the LRU list, adjusting insertion points in the LRU list.

17. The computer program product of claim 13, wherein a cache management application performs a LRU based replacement of tracks in the cache, and wherein the cache management application retains the first plurality of tracks in the cache for no more than the maximum retention time while performing the LRU based replacement of tracks in the cache.

18. The computer program product of claim 13, wherein generating the LRU list with the plurality of insertion points comprises:
determining a life cycle of one track in the LRU list by dividing a number of tracks in the cache by a number of tracks demoted per a time interval, wherein the life cycle of the one track in the LRU list is indicative of an average amount of time the one track is resident in the cache, the number of tracks demoted per the time interval is a demote rate, and the number of tracks in the cache is indicative of a size of the cache.

* * * * *